United States Patent [19]

Bell

[11] Patent Number: 5,594,882

[45] Date of Patent: Jan. 14, 1997

[54] PCI SPLIT TRANSACTIONS UTILIZING DUAL ADDRESS CYCLE

[75] Inventor: D. Michael Bell, Beaverton, Oreg.

[73] Assignee: Intel Corporation, Santa Clara, Calif.

[21] Appl. No.: 368,332

[22] Filed: Jan. 4, 1995

[51] Int. Cl.$^6$ .................................................. G06F 12/00
[52] U.S. Cl. ........................................................ 395/421.02
[58] Field of Search ..................... 364/DIG. 1, DIG. 2; 395/280, 290, 401, 410, 413, 419, 421.02

[56] References Cited

U.S. PATENT DOCUMENTS 5,283,904  2/1994  Carson et al. .
5,321,818  6/1994  Wendling et al. ........................ 395/290

OTHER PUBLICATIONS

"The Metaflow Architecture", IEEE Micro., by Val Popescu, Merle Schultz, John Spracklen, Gary Gibson, Bruce Lightner and David Isaman, 1991.

Primary Examiner—Robert B. Harrell
Attorney, Agent, or Firm—Blakely, Sokoloff, Taylor & Zafman

[57]  ABSTRACT

A scheme for providing split transaction capability on a PCI standard bus without modification to the existing PCI standard. Additional address bits are provided to a standard PCI address signal. The additional bits carry information regarding the requestor of a read transaction. By providing the requestor's identification to an addressed target, data is provided by the target device as a posted write. By using this enhanced mode, read requests need not be continually retried. If a target device is unable to respond to the enhanced address signal, the transaction is resent as a standard PCI address signal with the enhanced bits turned off.

11 Claims, 3 Drawing Sheets

PCI SPLIT TRANSACTIONS UTILIZING DUAL ADDRESS CYCLE

BACKGROUND OF THE INVENTION

1. Field of the Invention

The present invention relates to the field of microprocessors and, more particularly, to bus architecture utilizing multiplexed address and data signals on a bus.

2. Prior Art

The use of a microprocessor and its associated bus architecture in a computer system is well known. Also well known is the coupling of peripheral components onto a bus for providing various other functions related to the computer system. Some examples of such devices are disk drives, disk drive controllers, graphics accelerators, audio cards, modems and network connections. Generally, these peripheral components are coupled to a bus for effecting data transfer between various components. Typically, with simpler computer systems, the data transfer is between the peripheral device and either the processor (CPU) or main memory.

In order to achieve the above described data transfer, a variety of bus architectures and protocols have been developed over time. One well known prior art standard is the ISA/EISA input/output (I/O) bus standard for writing/retrieving data to/from peripheral units. However, as technology evolves, these bus standards become inadequate or obsolete, due to additional constraints placed on them. A recent introduction of an improved bus standard, referred to as the Peripheral Component Interconnect (PCI), provides for a higher bandwidth and speed. The PCI standard is also flexible in that the bus architecture is independent of new processor technologies.

Additionally, another aspect of advancing technology in the computer system area, especially in regard to microprocessor based systems, is the evolution of hierarchical bus structures. With new computer systems it is possible that several levels of buses are provided, each bus delineating a functional area serviced by components coupled to it. In hierarchical bus systems, it is not rare to find buses having different bus standards. Thus, systems may incorporate both ISA/EISA and PCI buses, each servicing its own set of peripheral. Bridge units are then utilized to effect data transfer between the various buses.

Due to the requirement for faster speed, the PCI bus has received acceptance as one of the newer bus standards for use as a "local" bus in a microprocessor based computer system. The local bus couples the main peripheral units of the system to the processor. Essentially, the local bus is the hierarchical level below the host (CPU) bus. The PCI bus standard is well equipped to be used as such a local bus. Other buses, such as the ISN/EISA bus can be used at a level below the PCI local bus. In some instances, a second PCI bus may also be used as a lower level bus for grouping lower priority or lower speed peripherals.

The PCI bus specification requires a multiplexed address/data signal in which address signals are sent first on multiplexed bit lines, followed by the data. The PCI bus also permits both "writes" and "reads" to be originated by devices on the bus. Thus, not only will the processor issue write and read requests, the same requests can also be originated by the peripheral components on the bus. This also includes bridge units coupled to the PCI bus, which bridge units will permit writes and reads to be generated by whatever bus or component is coupled on the opposite side(s).

Although the speed of the PCI bus is quite rapid by today's standards, an inherent weakness is in the read request. Currently in a hierarchical bus system, if an agent at the top of the hierarchy issues a read from an agent at the bottom of the hierarchy, the read transaction will potentially incur several retries as it traverses the hierarchy. The retries occur as a result of writes that have been posted in the opposing direction of the read. These posted writes must be delivered to their destination before a read transaction, which may be returning status about the posted writes, can be allowed to complete. Since PCI bus agents are competing for the bridge resources from both directions, it can be seen that propagating a read transaction from one end of the hierarchy to another is a somewhat random process. Generally, the system requires the agent with the retried read transaction continue to repeat the read indefinitely, until the bridge that is fetching the data has returned with the data.

It is appreciated that an improvement to the PCI read transaction that would reduce or eliminate the number of retried reads will provide for a more efficient and potentially a faster bus architecture.

SUMMARY OF THE INVENTION

The present invention describes a scheme for providing split transaction capability on a PCI standard bus without modifications to the existing PCI standard. The split capability can be embodied in a PCI bus bridge and/or implemented in master and target devices coupled onto a PCI bus. The invention is premised on issuing an address signal having more bits than that number required for addressing on a PCI bus. Since the current PCI bus standard is based on a single 32-bit word address scheme (but the standard will soon move toward a 64-bit scheme), the preferred embodiment envisions a dual cycle of 32-bit words (total of 64 bits) to provide the additional bits required to implement the split transaction.

Where the standard PCI address signal only issues the address of the destination, the enhanced address signal of the split transaction scheme also provides an identification of the originating agent, as well as status information regarding the transaction. This additional information is provided in the additional (more significant) address bits, The enhanced address signal is broadcast onto the bus first. If an agent is capable of responding in the enhanced mode, the transaction is completed. If no agents respond, then the address signal is resent, but this time with the enhanced address bits turned off. In the 32-bit word description above, the second transmission requires the broadcasting of only the one address cycle. However, a second transmission can still occur, if so designed, but the enhanced address bits are turned off. A non-enhanced mode device is now capable of responding to this address signal, since it is now recognizable.

A device capable of operating in the enhanced mode will receive a read request and can either provide the data immediately if it is ready or it can defer the transaction. If deferred, the originating agent need not continue to retry the read request. Since the originator of the request is known to the recipient (due to the originator's ID in the enhanced address signal), the target unit can later transmit the data as a posted write to the requesting device. Thus, read retries need not be repeated until the data is ready.

Economic Advantage: By providing for a scheme to reduce retry signals on a bus, data transfer on a bus is enhanced. This permits for improved processing and more enhanced information transfer. Processing more information per unit time has significant economic advantage.

DETAILED DESCRIPTION OF THE PREFERRED EMBODIMENT

A scheme for providing split transaction capability on a PCI standard bus without modification to the existing PCI standard is described. In the following description, numerous specific details are set forth, such as specific devices, bus protocols, address bits, memory locations, etc., in order to provide a thorough understanding of the present invention. However, it will be obvious to one skilled in the art that the present invention may be practiced without these specific details. In other instances, well known techniques and structures have not been described in detail in order not to unnecessarily obscure the present invention. It is to be noted that a preferred embodiment of the present invention is described, however, it is readily understood that other embodiments can be designed and implemented without departing from the spirit and scope of the present invention. Furthermore, it is appreciated that the present invention need not be limited to the PCI bus standard, but can be adapted for use with other bus standards as well.

Figure 1:
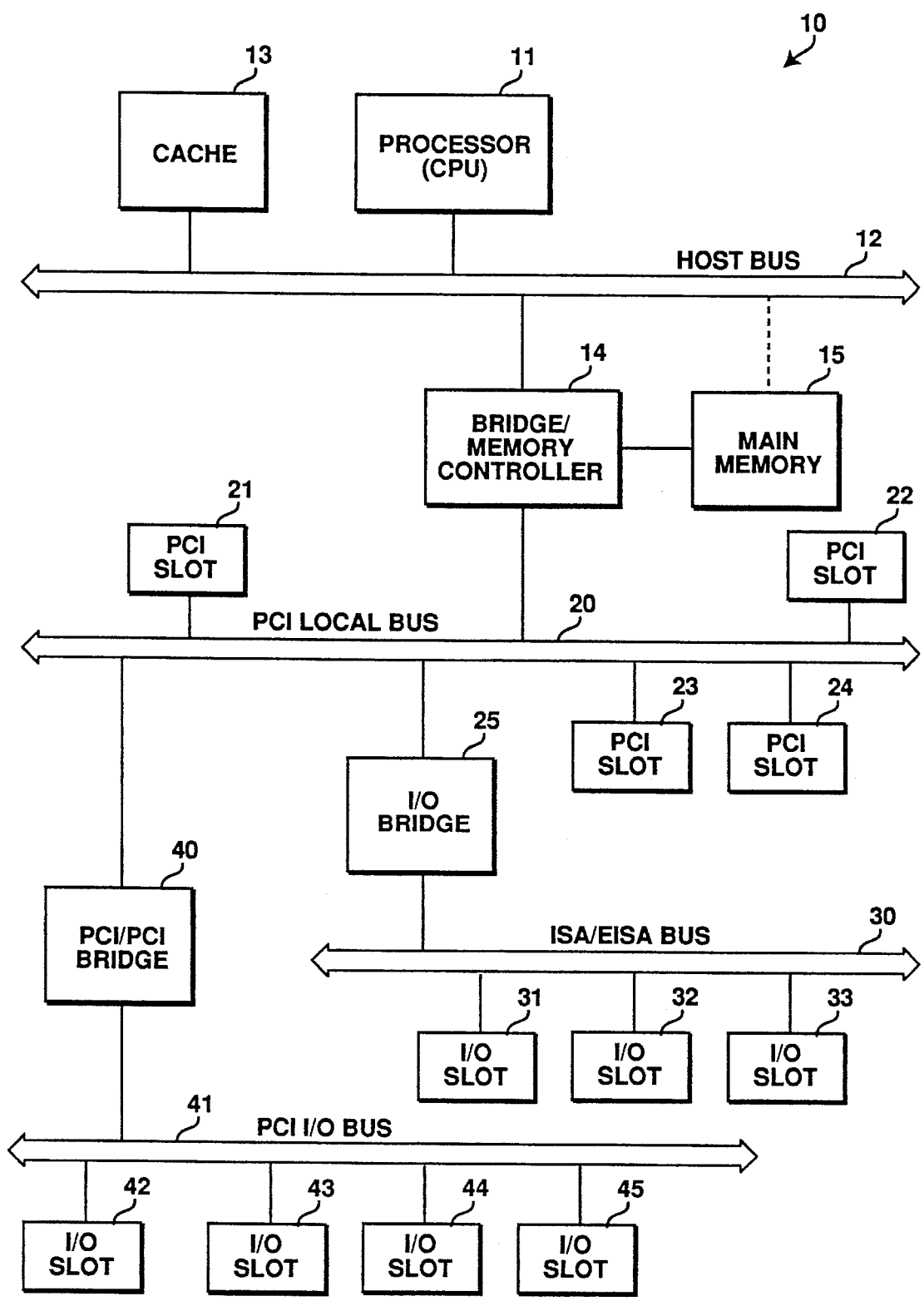
FIG. 1 is a schematic block diagram showing a computer system having a hierarchical bus architecture in which the present invention is implemented.

Referring to FIG. 1, a block diagram of a computer system architecture 10 utilizing a peripheral component interconnect (PCI) bus system architecture is shown. The computer system architecture 10 shown is generally implemented in personal computer systems utilizing the x86 architecture developed by Intel Corporation. However the architecture 10, as well as the practice of the present invention, need not be limited to the x86 architecture and can be readily implemented in other computer systems or architectures as well. The computer system architecture 10 includes a hierarchical bus organization in which the highest level is that of a main processor 11, which is also referred to a central processing unit (CPU). The CPU 11 is coupled to a highest level bus 12, which is generally referred to as a host bus. It is understood that bus 12 typically includes address, data and control lines for the transfer of various signals between devices coupled on bus 12. In some instances, separate lines are provided for each of the functions and in other instances, signals are multiplexed on some or all of the signal lines.

As shown in FIG. 1, a cache memory 13 is also coupled to bus 12, along with a bridge/memory controller unit 14. The cache memory 13 is typically a static random-access-memory (SRAM) and its operation and function are well known. The bridge/memory controller unit 14 functions to provide a bridging function between the host bus 12 and a PCI local bus 20. The PCI local bus functions as a "local bus" for the computer system 10 in which various peripheral devices are coupled to the system 10 through a plurality of PCI slots. In the particular example, only four PCI slots 21–24 are shown, but the actual number of such slots is a design choice. A variety of peripheral devices are coupled to the local bus 20 through the PCI slots. Examples of such devices are audio cards, graphics cards, motion video cards, SCSI controllers, floppy drive controllers, hard disk controllers, network (such as LAN) connections. These examples are provided for illustrative purpose and are not for the purpose of limiting the devices which can be coupled to local bus 20.

Unit 14 also includes a memory controller for the purpose of controlling accesses to main memory 15. Main memory 15 is typically a dynamic random-access-memory (DRAM) and its operation and function are well known. It is to be noted that the actual connections of main memory 15 to host bus 12 may vary. For example, in the example shown in FIG. 1, buffers may permit direct transfer of information between main memory 15 and data bus 12 under control of unit 14. In other designs, the main memory 15 could be coupled directly on bus 12. The various operations of the main memory are not critical to the understanding of the present invention. In the same manner, cache 13 can be coupled through bridge/memory controller unit 14, similar to main memory 15. Again, the various operations of the cache 13 are not critical to the understanding of the present invention.

An aspect of unit 14 which is crucial to the understanding of the present invention is its ability to transfer information between the host bus 12 and PCI bus 20. A device, such as CPU 11, on host bus 12 can request a "read" or a "write" access to a device located on bus 20. Furthermore, since local bus 20 is based on a PCI bus standard, devices on slots 21–24 can also request both read and write access. It is a function of unit 14 to arbitrate the various requests and provide for the requested action(s) to be completed. A variety of techniques for providing such arbitration is known and one technique is described in a patent application entitled "Bridge Buffer Management By Bridge Interception Of Synchronization Events;" Serial No. 886,962; filed on May 21, 1992, which is incorporated by reference herein.

Also coupled to the PCI local bus 20 is an input/output (I/O) bridge unit 25. The purpose of bridge 25 is to arbitrate and transfer information between the PCI local bus 20 and a third tier bus identified as I/O bus 30. As shown, bus 30 is an ISA or an EISA standard bus. Both ISA and EISA standards are well known for providing I/O connections and protocol to past and existing computer systems. Thus, bus 30 includes a plurality of I/O slots for coupling ISA and/or EISA devices for use with the PCI local bus 20. Although only three ISA/EISA slots 31–33 are shown, the actual number to be used is a design choice. A variety of techniques for providing such arbitration within bridge 25 are available and one such technique is described in a patent application entitled "PCI to ISA Interrupt Protocol Converter And Selection Mechanism;" Serial No. 267,827; filed on Jun. 28, 1994, which is incorporated by reference herein.

Also coupled to the PCI local bus 20 is a PCI-to-PCI (PCI/PCI) bridge 40 that is used for the transfer of information between the PCI local bus 20 and a PCI I/O bus 41. PCI bus 40 is a separate PCI bus from the PCI local bus 20. The purpose of bus 41 is to provide a peripheral bus, similar to that of bus 30 but utilizing a PCI bus standard instead of the ISA/EISA standard. A second PCI bus 41 is used, since each PCI bus (under the current standard) is limited to ten electrical loads. A PCI connector is equivalent to two electrical loads. Additional PCI buses allow the addition of more peripherals, which is especially important for servers.

A plurality of PCI I/O slots are located on bus 41 to provide I/O slots for coupling peripherals. Only four PCI I/O slots 42–45 are shown coupled to bus 41, but the actual number of such slots is a design choice. It should be appreciated that either bus 30 or 41 can be utilized for providing the I/0 capability in a computer system. Providing both buses 30 and 41 allows both PCI and ISA/EISA protocols to be used with a computer system.

An advantage of using bus 41 is the advantage derived from having a PCI bus standard applied to an I/O bus. However there is an added complexity in that bus 41 is a PCI bus capable of accessing information using both "writes" and "reads." Accordingly, similar to bridge 14, bridge 40 will need to arbitrate write and read requests from both buses coupled to it. That is, bridge 40 will need to arbitrate write and read requests on bus 20, as well as write and read requests on bus 41.

In the hierarchical system 10, a device at the top of the hierarchy, such as CPU 11, may require access to a device at the bottom of the hierarchy, such as I/O slot 31 or slot 42. This access can be a read or a write. Alternatively, a device at the bottom of the hierarchy, such as a device on I/O slot 42, may require access to a device at the top of the hierarchy, such as memory 15. The access may be a read or a write. For such transfers, the information must pass through two bridge units for the transfer to occur. Fortunately, the PCI bus standard permits posted writes through the bridge unit so that complete paths need not be maintained for the data transfer.

For example, in order to write data from the CPU 11 to a device on slot 42, bridge unit 14 will accept data, which can be packetized data, from the CPU 11 and once this data is stored within bridge 14, bus 12 is freed so that other actions can occur on bus 12. After arbitrating for bus 20, data is transferred to bridge 40 from bridge 14. Subsequently, bus 20 is released to permit other actions to transpire on bus 20. Bridge unit 40 then arbitrates for bus 41 to provide the final data transfer to slot 42. A write operation from slot 42 to a device at the top of the hierarchy is done in reverse. The bridges maintain the controls to effect and complete the data transfer. An example of maintaining such control is noted in the afore-mentioned application entitled "Bridge Buffer Management By Bridge Interception Of Synchronization Events." It is evident that without such controls through the bridge units, data transfer from CPU 11 to slot 42 will necessarily require a complete connection from CPU 11 to slot 42, which will "tie up" all three buses until the transfer is completed.

Although a write operation can be arbitrated from bridge to bridge, a read operation is a bit more complicated. For example, for CPU 11 to request a read from a device at slot 21, the read request is transferred to bridge 14. After arbitrating for bus 20, bridge 14 then request a read from slot 21. While the device on slot 21 is preparing to respond to this request, bus 20 can be released, similar to the release of bus 12 after the CPU had transferred the request to bridge 14. However, unlike the write operation, the requesting device must continue to interrogate the target device at periodic intervals to determine if the data is available for transfer.

Thus, bridge 14 will periodically interrogate slot 21 to determine if the data has been acquired. If the data is ready, bridge 14 will read the data. During this time CPU 11 also continues to periodically interrogate bridge 14 to determine its status. When data has been acquired by bridge 14, then CPU 11 can request the data from bridge 14. As can be surmised, if the amount of data being requested is substantially lengthy, it may take several accesses before all of the data can be transferred. A significant amount of cycles are lost simply for interrogating the target device for data availability.

If the target device is farther distant on the hierarchical level, additional transfers are required between bridge units and additional time is lost in interrogating the next level target device for data availability. Thus, if CPU 11 had requested a read from slot 42 instead of from slot 21, then the access arbitration is extended past bridge 14 through bridge 40 to the target device at slot 42. Also, a read access from a device on bus 41, such as a device on slot 43, to the top of the hierarchy will also entail significant amount of time loss due to acquiring the data. It is to be noted that any read request which fails, due to data not being ready or loss of arbitration due to a higher priority action on a given bus, results in a failure and such access request will need to be retried.

In a write access the requestor originates the address and the data. In a read access, the requestor originates the address, but the target originates the data. Therefore, write accesses typically require less time to achieve the data transfer than read accesses. Accordingly, in order to lessen the number of "retries" required to effect data transfer, the present invention attempts to provide a scheme for obtaining a "read" without a need for such retries to ascertain data availability. Furthermore, in order to maintain compatibility with existing PCI bus standard, the present invention utilizes a PCI split transaction to achieve this "read." Thus, the split transaction scheme of the present invention is implemented in the computer system 10 having the hierarchical bus structure.

Figure 2:
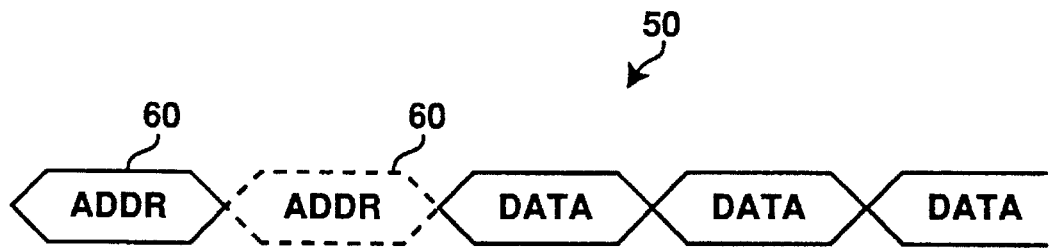
FIG. 2 is an example of a PCI bus signal having multiplexed address and data cycles.

Referring to FIG. 2, a multiplexed address and data signal 50 utilized on a PCI bus is shown. It is to be understood that other control signals, such as clock, frame, command and bit enable, as well as others, are utilized on a PCI bus, but are not being described since such signals are not critical to the understanding of the present invention. An address portion of the signal 50 can be of one or two cycles depending on the number of address lines present. If the PCI bus is a 64-bit bus, then only one address cycle is required. If the bus is a 32-bit bus, then two address cycles (each 32 bits in length) are generated (the second address cycle is shown by a dotted line in FIG. 2). The address signal is then followed by one or more data cycles. It should be emphasized that in a prior art PCI bus system, only one address cycle is required if the maximum memory to be addressed does not exceed 4 G ($2^{32}$) bytes.

Figure 3:
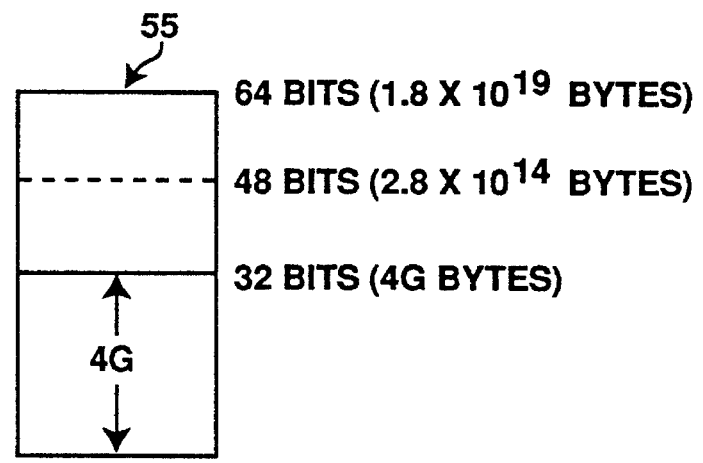
FIG. 3 is an illustration of memory mapping depending on the number of bits used to address the memory.

Also referring to FIG. 3, a memory 55 is shown in which the size of the memory will determine how many address bits are required to access it. For example, 4 gigabytes (4 Gbytes) of memory is accessible by 32 bits of address. An address signal of 64 bits is capable of accessing $1.8 \times 10^{19}$ bytes of memory, which is quite considerable by current standards. Many current generation personal computers still operate with memory allocations of less than 1 G byte. Thus, even though 32 bit and 64 address bit data transfers are practical, it will be some time before full 64 bit memory allocation mapping is practical. The present invention attempts to exploit this extended addressing scheme in order to enhance the PCI read instruction capability of the PCI bus standard.

Since the PCI bus is a multiplexed bus, an address signal precedes data on the same bit lines. Therefore, a 32-bit data bus will necessarily provide a 32-bit address signal as well. If the bus is a 64-bit line bus, then the data and address signals will typically have a length of 64 bits (it is possible to have 64 bit address and still have 32 bit data). However, as noted above, it will be rare to have a memory of $1.8 \times 10^{19}$ bytes. More than likely, size of the memory that will be employed in the future for some appreciable time will have memory capacity greater than 4 Gbytes but significantly less than $1.8 \times 10^{19}$ bytes. The preferred embodiment presumes that a memory that can be addressed by a 48-bit address signal offers considerable expansion room before its limit of $2.8 \times 10^{14}$ bytes is reached. Therefore utilizing 48 bits as the maximum addressable memory capacity available in a system, the other 16 bits of a 64-bit address signal are not utilized in a PCI bus standard. The present invention utilizes these upper unused address bits to transfer information regarding the agent originating a read instruction on to a PCI bus.

Referring again to FIG. 1, an agent originating a write access on to a PCI bus does so by identifying the target by its address during the address portion of signal 50. Data which is to be written to the target is sent following the address portion of the signal. A read access from an originating agent is constrained in that the data flow is from the target to the originating agent. However, it is the originating agent which still sends the address portion of signal 50. The target sends the data to the originating agent during the data portion of signal 50. Again, the difficulty of achieving this read data transfer in a hierarchical bus structure was earlier described.

Figure 4:
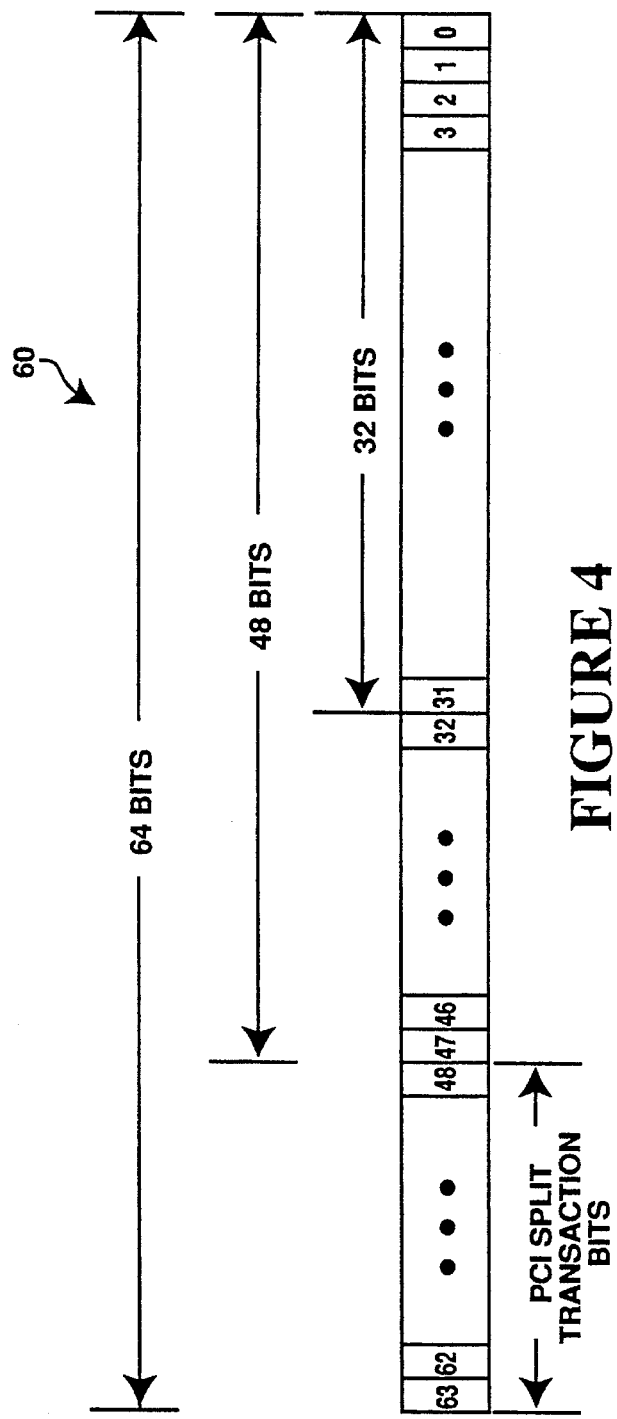
FIG. 4 is an illustration of a 64-bit PCI address word in which a split transaction of the present invention is utilized in bits 63:48.

In order to reduce the number of "read request" retries, the present invention sends information about the originator in the upper most bits of the address signal 60 of signal 50. Since the preferred embodiment assumes a maximum addressable memory limit to be that of 48 bits ($2.8 \times 10^{14}$ bytes), only 48 bits are needed for addressing. The remaining 16 bits, which are normally unused, are now utilized to convey information regarding the originator. An illustration of the bit allocation for an address signal 60 is shown in FIG. 4.

Thus, assuming a 48 bit addressable memory, bits 47:0 of the address signal are used for addressing. Bits 63:48 are utilized to convey information regarding the originator's action. These bits are termed split transaction bits, since they are utilized to provide a PCI split transaction as will be described below. In using the PCI multiplexed signal 50 of FIG. 2, the number of actual address cycles used will depend on the size of the bus utilized. For a 64-bit bus, only one address cycle is required. However, if the bus is a 32-bit bus, then two (dual) address cycles are needed to provide a 64-bit address signal. If the memory allocation requires less than 48 bits, then the unused bits are set to zero. Thus, if the memory size is 4 G bytes, then only 32 address bits are needed. Bits 47:32 are not used (set to zero).

Figure 5:
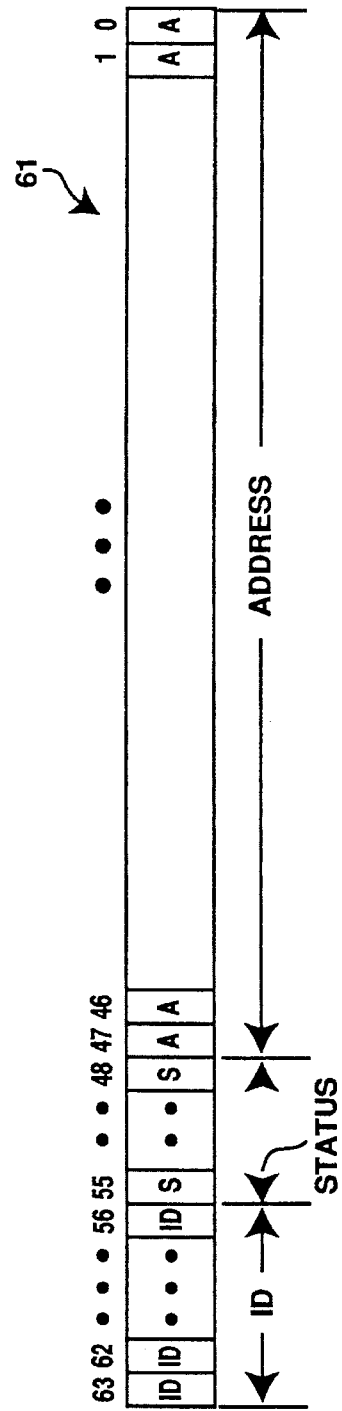
FIG. 5 is an illustration of a 64-bit PCI address word utilizing the split transaction of the present invention in which bits 63:56 are used for an originator ID and bits 55:48 are used for status.

Referring to FIG. 5, a 64-bit address signal (dual 32-bit words) 61 is shown in which bits 47:0 are used for addressing and bits 63:48 are used to convey the split transaction information. Bits 63:56 are designated as Identification (ID) bits, while bits 55:48 are designated as status bits. The ID bits convey a unique identification of the originator. The status bits convey information regarding a particular transaction. For example, they can indicate the number of words (or doubleword) or lines to fetch. Again, if the system uses a 32-bit address scheme, only one address cycle is needed for the standard PCI addressing mode. The dual address cycle is used only in the enhanced mode.

When this split transaction addressing scheme is used, it is preferred that all devices on a PCI bus be capable of using it. However, in order to provide for compatibility, it is anticipated that some devices on a given PCI bus will not have the capability to utilize the split transaction addressing scheme. Since these devices will only respond to the normal PCI bus standard and not to the enhanced addressing scheme, the present invention provides a scheme to operate with both types of devices. Thus, a split transaction scheme is described as an enhancement to the established PCI bus standard. It should be noted that either type of device (one operating under the standard protocol or one operating under the enhanced protocol) can be coupled for use on a PCI bus using the split transaction scheme. A PCI compatible device need not incorporate the scheme of the present invention for it to function properly on the split transaction PCI bus. However, it is desirable for bridges on a PCI bus to be capable of operating under the enhanced protocol implementing the split transaction. The term "split transaction" is used to define the dual nature of the PCI addressing scheme as described below.

When a standard PCI command is generated, only the address of the target is sent in the address portion of the multiplexed signal 50. The actual number of bits used is dependent on the bus structure, but will vary between 32 to 48 bits for most computer systems. If a device on the bus has a recognizable address, it will acquire the signal. If the address is not recognized, then a failed connection is noted. If a device does recognize the address, then the operation will proceed accordingly as earlier described.

When a PCI bus utilizes the split transaction of the present invention, the enhanced addressing scheme is utilized. Thus, bits 63:48 are used to convey the additional information regarding the identification of the originator and status of the transaction. The address of the target is also provided in the appropriate lower number of bits used for addressing. This lower portion of the address signal is identical to the address provided under the standard PCI bus protocol. The enhanced address signal is then placed on the bus. Assuming that the target device being addressed is on the bus, it will acquire the signal if it is capable of operating in the enhanced mode. The target will understand that bits 63:48 are to be utilized according to the enhanced mode.

If the target is not capable of responding to the enhanced addressing mode, an access failure is noted. The originator at this point is not certain if the failure occurred due to a target of that address not being present on the bus or if the addressed target is not capable of accepting the enhanced addressing mode. Thus, when an access failure occurs in the enhanced mode, the originator will convert all enhanced mode bits to zero and resend the signal again, this time under the standard PCI mode. The destination address bits remain unchanged. An access failure (known as master abort in PCI terminology) this second time around clearly informs the originator that the target is not present on the bus.

It is to be noted that the enhanced mode of operation is completely transparent to a device not capable of operating in this mode, since any enhanced mode signal appears as an address not targeted for that device. The standard transaction is initiated only after the failure of the enhanced mode address signal from being acquired. It is appreciated that for a PCI bus to operate in this enhanced mode, the bridge units associated with data transfer on the PCI bus must be capable of operating in this enhanced mode.

When an enhanced mode address signal is acquired by the designated target during a read access, bits 63:48 relay information regarding the originator. If data is available at this time, a read access can take place. If data is not available, a retry signal is generated. The bus then release the originator. However, because bits 63:56 identify the originator, the originator need not continue to interrogate the target unit to determine if data is ready for the read operation to occur. Instead, the originator is freed to pursue other operations. When data at the target is ready for the read operation, the target instead generates a write access using the originator's ID. This write operation uses the enhanced mode bits 63:48 with bits 63:56 indicating the originator's ID. Status bits 55:48 indicate a successful data transaction, retry or target abort by the target. The destination is known due to the unique ID earlier conveyed to the target by address bits 63:56. Since each split transaction capable device will have a unique ID in the system, the originator of the read access is uniquely identified. Essentially, what transpires is that a read operation from the originator becomes a write operation from the target.

It is to be appreciated that the split transaction can be utilized beyond a single bus. Because agent IDs are unique, the transaction can be utilized in a hierarchical bus structure where more than one bus is used. For example, an agent at the top of the hierarchy can generate a read access from a target at the bottom of the hierarchy. It will be an added function for the bridge units to maintain proper transaction when more than one split transactions are occurring on the bus. The bridge units will need to monitor each split transactions as well as target response to enhanced or standard mode of addressing.

One example of a split transaction operation is described in reference to the system 10 shown in FIG. 1. Assuming that a read access is generated by the CPU 11 to read data from a target device located at I/O slot 43. Assume also that the two PCI buses 20 and 41, as well as bridge units 14 and 40 are capable of operating in the split mode. Assume also that all buses are 32-bit buses (although they could be larger in the number of bits, for example 40 bits), so that only a single address cycle is necessary when operating in the standard PCI protocol mode.

When the read request is generated by CPU 11, a read access signal using an address portion of 64 bits is sent to bridge unit 14 (It should be noted that some host buses may be capable of handling the split transaction. Others without the split transaction capability would need to retry the read until data arrives, but such retries are not propagated down the hierarchy). Bits 63:48 of the address convey originator ID and status information. Bits 47:32 are zero and bits 31:0 convey the 32 bit address of the target device. The bridge unit 14 receives the information, at which time CPU 11 is free to pursue other tasks. The CPU 11 need not continue to interrogate bridge 14 to check if the data is ready for reading, unless it is not capable of split transactions. In that case, the host bridge issues retry responses to the CPU's inquiries until the read data arrives.

Next, bridge unit 14 transfers the read access to bridge unit 40 at which time bus 20 is free to pursue other tasks. It is imperative that bridge unit 14 retain the ordering of this split transaction signal which was sent to bridge 40. Subsequently, bridge 40 sends forth the read access signal on bus 41. Bits 31:0 will have the address of the device located in slot 43. However, the action at slot 43 will depend on the nature of slot 43.

If slot 43 is capable of accepting a split transaction, it will acquire the read access signal on the first transmission from bridge 40. Assuming that data is not ready for transfer from slot 43, bridge 40 will then release itself from slot 43. When data is ready for transfer, slot 43 generates a write command to CPU 11 (or wherever CPU 11 had designated for delivery of the data) and the second part of the read transaction is performed as a write operation. The destination is known since this information was conveyed in bits 63:48 of the read access signal during the first part of the transaction. As noted above, the bridge units will need to maintain the ordering so that all pending split transactions are returned in the order generated from each bridge. This is simply a matter of accepting the split writes (returning writes of the split transaction) in the order of the reads sent from the bridge.

However, if slot 43 is not capable of a split transaction, then it will operate under the standard mode. In that instance, slot 43 will not have recognized the original read access signal. The bridge 40 will have received a failed access response. When the initial enhanced mode signal is not acquired, the bridge unit reinitiates the read access signal again, but this time with bits 63:48 set to zero (since bus 41 is a 32-bit bus in this example, only one address cycle of 32-bit length need be generated, due to bits 47:32 being zero). This time, slot 43 will recognize the address and will respond. However, because this is not an enhanced mode operation, bridge 40 will need to continue interrogating slot 43 to determine if the data at slot 43 is ready. Thus, a normal standard mode PCI read operation is carried out when an enhanced mode signal is not acquired by a target.

As earlier noted, if slot 43 is operating under the enhanced mode, bridge 40 need not continue to interrogate slot 43. Rather, when data is ready for transfer at slot 43, slot 43 will generate a write command. This write signal is then propagated in reverse up the hierarchical "ladder" to the intended target.

An advantage of the split transaction scheme permits two modes of operation on a PCI bus. The enhanced mode reduces the arbitrary number of reads which occur before the requested data is matched to the originator of the data. However, by still permitting the use of existing mode (standard mode) of PCI bus operation, compatibility is maintained with existing devices not capable of operating in the enhanced mode.

Finally, is appreciated that the number of total bits utilized in the address, as well as the number of bits dedicated for the enhanced mode is strictly a design choice, mostly dictated by the bus architecture and the available memory. The split transaction capability can be designed into the bus bridge, the peripheral devices or both.

Thus, a split transaction for a PCI bus is described.

I claim:

1. A method for providing a split transaction on a bus having a set number of address bits in an address signal and in which said address signal is used to address a target unit, comprising the steps of:

providing additional address bits in addition to said set number of address bits, said additional address bits conveying identification information about an originating unit of a transaction signal comprising said address signal;

transmitting said address signal onto said bus, including said additional address bits conveying said identification information;

completing transfer of said transaction signal to said target if said target is capable of receiving said address signal including said additional address bits;

resending said address signal onto said bus without said additional address bits if said target is non-responsive to first transmission of said transmitting step above;

wherein identity of said originating unit is transferred with said transaction signal if said addressed target is acquired when said additional address bits are transmitted.

2. The method of claim 1 further including a step of posting a write transaction by said target to transfer data to said originating unit, if said transaction signal is a read signal to read data from said target and said target was responsive to said first transmission of said address signal, including additional address bits.

3. The method of claim 2 wherein one of said originating unit or said target is coupled to a second bus on a hierarchical bus system of a computer system.

4. The method of claim 3 in which said step of resending said address signal is accomplished by setting said additional address bits to zero instead of not sending them.

5. A method for providing a split transaction on a Peripheral Component Interconnect (PCI) bus having a standard establishing a set number of address bits in an address signal and in which said address signal is used to address a target unit, comprising the steps of:

providing additional address bits in addition to said set number of address bits, said additional address bits conveying identification information about an originating unit of a transaction signal comprising said address signal;

transmitting said address signal onto said PCI bus, including said additional address bits conveying said identification information;

completing transfer of said transaction signal to said target if said target is capable of receiving said address signal including said additional address bits;

resending said address signal onto said PCI bus without said additional address bits if said target is non-responsive to first transmission of said transmitting step above;

wherein identity of said originating unit is transferred with said transaction signal if said addressed target is acquired when said additional address bits are transmitted.

6. The method of claim 5 further including a step of posting a write transaction by said target to transfer data to said originating unit, if said transaction signal is a read signal to read data from said target and said target was responsive to said first transmission of said address signal, including additional address bits.

7. The method of claim 6 wherein one of said originating unit or said target is coupled to a second bus on a hierarchical bus system of a computer system.

8. The method of claim 7 in which said step of resending said address signal is accomplished by setting said additional address bits to zero instead of not sending them.

9. A method for providing a split transaction on a 32-bit Peripheral Component Interconnect (PCI) bus having a 32 address bits in an address signal and in which said address signal is used to address a target unit, comprising the steps of:

providing additional 32 address bits in addition to said 32 address bits, wherein said two sets of 32 address bits are sent in two cycles of said address signal, said additional address bits conveying identification information about an originating unit of a transaction signal comprising said address signal;

transmitting both cycles of said address signal onto a bus, including said additional address bits conveying said identification information;

completing transfer of said transaction signal to said target if said target is capable of receiving said dual cycle address signal including said additional address bits;

resending said address signal as a single cycle address signal without said additional address bits if said target is non-responsive to first transmission of said transmitting step above;

wherein identity of said originating unit is transferred with said transaction signal if said addressed target is acquired when said additional address bits are transmitted.

10. The method of claim 9 further including a step of posting a write transaction by said target to transfer data to said originating unit, if said transaction signal is a read signal to read data from said target and said target was responsive to said first transmission of said address signal, including additional address bits.

11. The method of claim 10 wherein one of said originating unit or said target is coupled to a second bus on a hierarchical bus system of a computer system.

* * * * *